(12) United States Patent
Hinterseer

(10) Patent No.: US 6,354,352 B1
(45) Date of Patent: Mar. 12, 2002

(54) METHOD FOR WELDING THERMOPLASTIC FOILS

(75) Inventor: Heinz Hinterseer, Freilassing (DE)

(73) Assignee: Paul Kiefel GmbH, Freilassing (DE)

( * ) Notice: Subject to any disclaimer, the term of this patent is extended or adjusted under 35 U.S.C. 154(b) by 0 days.

(21) Appl. No.: 09/534,286

(22) Filed: Mar. 23, 2000

(30) Foreign Application Priority Data

Mar. 25, 1999 (DE) .......................................... 199 13 617

(51) Int. Cl.$^7$ ................................................ B30B 15/34
(52) U.S. Cl. ...................... 156/581; 156/553; 156/583.1
(58) Field of Search ................................ 156/553, 580, 156/581, 583.1; 53/562; 493/189, 209; 100/350, 193, 194

(56) References Cited

U.S. PATENT DOCUMENTS

| | | | |
|---|---|---|---|
| 2,918,106 A | 12/1959 | Fener ........................... | 154/42 |
| 5,369,941 A | * 12/1994 | Rapparini ..................... | 53/546 |
| 5,564,252 A | 10/1996 | Adelmann .................... | 53/202 |
| 5,862,653 A | * 1/1999 | Solano ......................... | 53/563 |

FOREIGN PATENT DOCUMENTS

| | | |
|---|---|---|
| DE | 2015747 | 10/1971 |
| DE | 2101231 | 9/1972 |
| DE | 2101232 | 9/1972 |
| DE | 3929374 | 3/1991 |
| DE | 195 02 228 A1 | 5/1996 |
| DE | 297 20 469 U1 | 3/1998 |
| DE | 197 43 158 A1 | 4/1999 |
| FR | 1141100 | 1/1956 |
| FR | 2563502 | 10/1985 |
| GB | 789981 | 1/1958 |

* cited by examiner

Primary Examiner—James Sells
(74) Attorney, Agent, or Firm—Friedrich Kueffner

(57) ABSTRACT

In a method for simultaneously welding to one another the layers of several pairs of thermoplastic foils arranged in a stack, a primary heat energy source is positioned between two pairs of thermoplastic foils, and welding heat energy is supplied to the two pairs via the primary heat energy source. The press for performing this method has two pressing elements for applying pressure to the stack of n pairs of layers of thermoplastic foils. The two pressing elements are positioned at opposite ends of the stack and force the layers of the pairs of thermoplastic foils toward one another. A stacked arrangement of n–1 flat, bar-shaped heating elements is aligned with the two pressing elements. Between two adjacent heating elements a respective pair of thermoplastic foils is received such that the pairs of thermoplastic foils alternate with the heating elements. The stacked arrangement of the heating elements is arranged in a plane that is perpendicular to the planes of the thermoplastic foils.

15 Claims, 1 Drawing Sheet

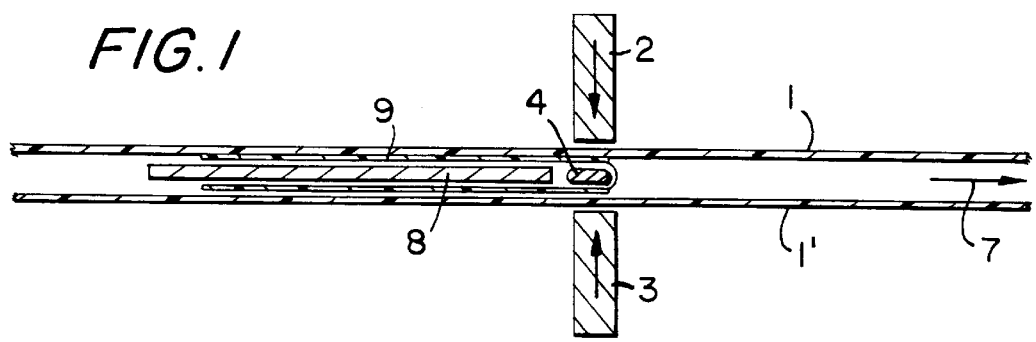
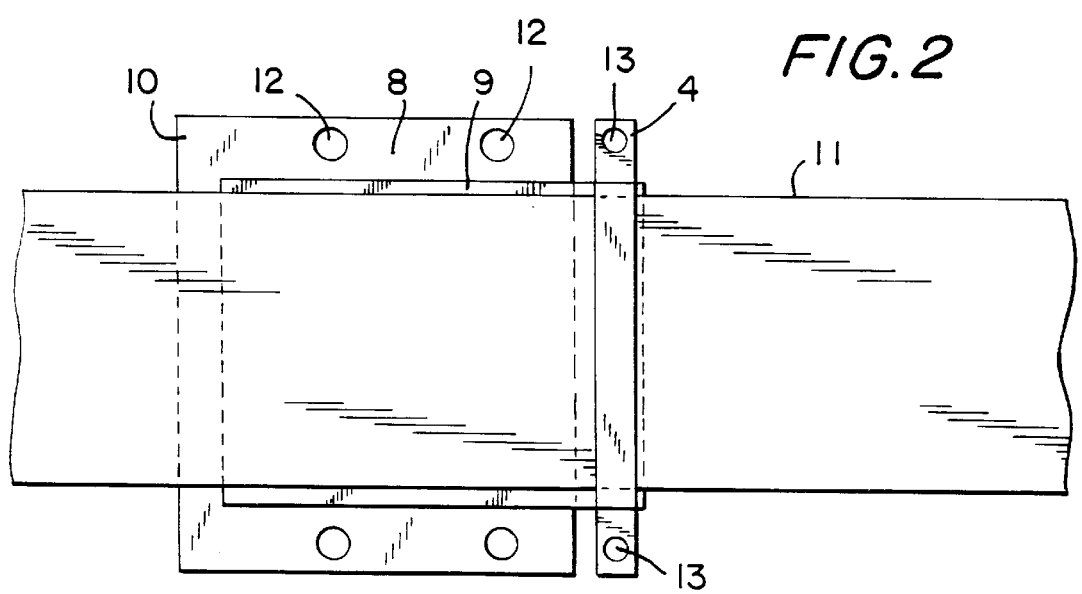
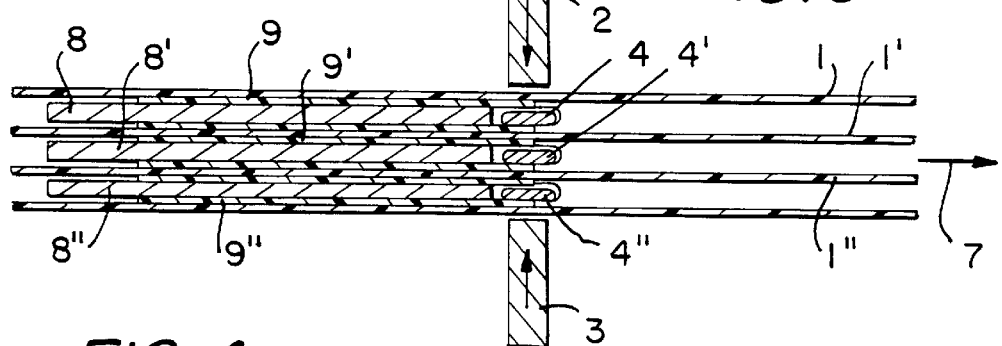
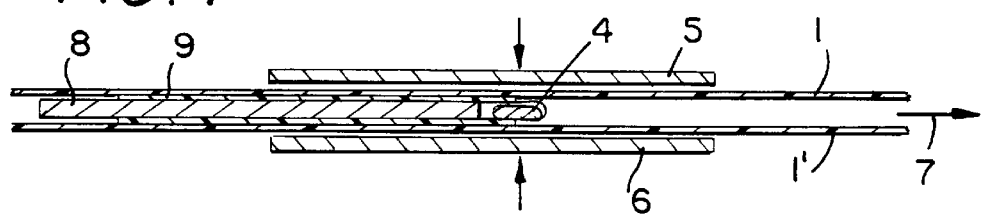

METHOD FOR WELDING THERMOPLASTIC FOILS

BACKGROUND OF THE INVENTION

1. Field of the Invention

The invention relates to a method for simultaneously welding pairs of layers of thermoplastic foils stacked atop one another with the aid of welding bars etc., that are brought into welding contact externally at the stacked foil layers to load the foil layers against one another and to supply the welding heat.

2. Description of the Related Art

In a known method of this kind (German patent document 39 29 374), which is designed for producing envelope-like or pocket-like articles, two pairs of layers of thermoplastic foil are pressed together by welding bars with interposition of a stationary separating strip and are welded together in that the welding energy for welding is provided in the form of heat supplied respectively by the welding bar that is facing the neighboring foil layer pair to that foil layer pair so that it is heated to the welding temperature. The welding energy must flow through the proximal one of the two layers of the foil layer pair in order to also reach the area of the remote layer and to elevate its temperature to the required melting temperature for the welding process. The required melting energy thus must be transmitted via the outer (proximal) foil layer into the second (remote) one and bring the second one to the desired melting temperature so that the fusing or connecting mechanism is in the end performed by a kneading action in the thermoplastic range.

In this manner, two foil layer pairs can thus be simultaneously welded. The welding process, however, is relatively time-consuming because the welding energy requires a relatively long period of time in order to reach the interior of the contact area of the two foils of each foil layer pair. In particular when thicker foils are to be welded, the correspondingly required amount of time has been proven to be very disadvantageous.

Of course, the afore mentioned method cannot be employed when more than two foil layer pairs are to be welded simultaneously to one another.

SUMMARY OF THE INVENTION

It is an object of the present invention to further develop the method of the aforementioned kind such that with reduced amount of time the simultaneous welding of two foil pairs is possible even when relatively thick foils are to be welded.

In accordance with the present invention, this is achieved in that, when two foil layer pairs are to be welded, the welding heat is supplied to these two foil layer pairs preferably from the interior by employing a heat energy source which is arranged between the two foil layer pairs and, optionally, additional (ancillary) welding heat is provided by means of an ancillary energy source.

The method according to the invention, with which the aforementioned object is solved, is characterized in that, when two foil layer pairs are used, these two foil layer pairs are supplied with the welding heat or welding energy from the interior by employing a heat energy source positioned between the two foil layer pairs and, optionally, in that additional welding energy is supplied from the exterior by an ancillary energy source.

In this way, the area where the welding seam is to be formed on the foil layer pairs can be heated in a very simple manner and within a short period of time to the required welding temperature. As an ancillary energy source the use of welding bars or the like, which force the foil layer pairs against one another by loading them externally, has been found to be beneficial. When employing the inventive method, the use of a bar-shaped, inwardly positioned, flat energy source as the interposed primary heat energy source has been proven to be especially expedient.

A further very advantageous embodiment of the method according to the invention employs n−1 bar-shaped, inwardly positioned (interposed) heat energy sources for the simultaneous welding of n foil layer pairs. The bar-shaped, inwardly positioned, heat energy sources release their energy in both directions, i.e., in the upward and downward directions to the respectively adjacently positioned foil layer pairs. In this way, it is thus possible to subject several foil layer pairs, arranged in a stack, to a simultaneous welding process in order to multiply in this manner the number of envelope-like or pocket-like articles that can be simultaneously produced from thermoplastic foils.

In a variant of the inventive method, in addition to heating by means of the centrally arranged bar-shaped heating energy source positioned respectively between two neighboring foil layer pairs, it is also possible to provide an external pressure loading by heated pressing plates.

The invention is not limited to a method but is also concerned with a press for performing the method. In accordance with the present invention, the press is characterized by two pressing elements for loading several, preferably n, foil layer pairs, wherein the pressing elements, preferably in the form of welding bars that are heatable, rest against the outer ends of the stack of foil layer pairs and force the foil layer pairs toward one another, as well as n−1 bar-shaped, flat energy sources which are arranged in a plane which is positioned at a right angle to the foil planes.

This press according to an especially preferred embodiment is characterized by a removal device for a common removal of all of the foil layer pairs, preferably by intermittent removal action, from the welding area.

For augmentation of the removal of the foil layer pairs from the area of the bar-shaped, flat energy sources, it is advantageous when in the same plane in which the bar-shaped flat energy sources are positioned, flat support elements are provided which have an outer coating that suppresses adhesion of the foil layer pairs.

The outer coating of the support elements is expediently a heat-resistant, resilient, especially wear-resistant, foil envelope made of an insulating material, preferably PTFE (polytetrafluoroethylene), optionally containing embedded fiberglass. The foil envelope is expediently provided at its side facing away from the foil layer pairs with an adhesive coating for fastening to the flat support elements.

It was found to be beneficial when the foil envelope is folded in a U-shape and guided about the bar-shaped, flat energy source so that the two legs of the U-shaped foil envelope rest on the oppositely positioned surfaces of the flat support elements to form its outer coating.

For generating the heat energy, the bar-shaped flat energy sources can have a flat, bar-shaped core as a support of an electrically heatable heating strip. In an especially expedient configuration, at least that portion of the folded U-shaped foil envelope that contacts the bar-shaped core is formed by the electrically heatable heating strip.

The bar-shaped, flat energy sources can be most expediently realized by electrically heatable nickel constantan bodies. The flat support elements can be formed by sheet metal members which guide the foil pairs separately through the press, wherein the sheet metal members preferably have a thickness of 2 to 3 mm.

In order to ensure in a simple manner the positioning of the sheet metal members, their lateral edge portions, which project past the longitudinal edges of the thermoplastic foils, are expediently provided with fixation bores for receiving fastening bolts.

BRIEF DESCRIPTION OF THE DRAWING

In the drawing:

FIG. 1 is a schematic side view illustrating the press for performing the welding method according to the invention, with two foil layer pairs passing through the press;

FIG. 2 is a schematic plan view onto the press according to FIG. 1;

FIG. 3 is a schematic view of the press according to FIG. 1 configured for welding more than two foil layer pairs; and FIG. 4 is a view of the press according to FIG. 1, however provided with heated pressing plates instead of the more narrow welding bars.

DESCRIPTION OF THE PREFERRED EMBODIMENTS

The inventive method can be performed with the aid of presses schematically illustrated in the drawing. The inventive method is designed for simultaneously welding pairs 1, 1' of layers of thermoplastic foils stacked on top one another. They are simultaneously welded with the aid of welding bars 2, 3 which are brought into welding contact externally at the stacked foil layers, load the foil layers against one another, and supply the welding heat to the foil layer pairs 1, 1'.

In methods of the prior art a stationary separation strip is provided between two neighboring foil layer pairs. The welding energy must be supplied by the neighboring welding bar and must then essentially flow through both layers of the foil layer pair in order to reach the area of the remote layer. This is disadvantageous because of the inherent time delay. According to the invention, a more economical welding of the two foil layer pairs 1, 1' can be achieved in that the welding heat energy is not only supplied from the exterior via the welding bars 2, 3 that load the outer sides of the foil layer pairs but also from the interior by employing a heat energy source 4 positioned between the two foil layer pairs 1, 1'. This is realized expediently by employing a bar-shaped, inwardly positioned, flat energy source as an interposed heat energy source (primary heating element) 4. Accordingly, n−1 bar-shaped, inwardly positioned, flat energy sources 4, 4', 4", . . . are employed for the purpose of simultaneously welding n foil layer pairs 1, 1', 1" . . . , as shown in FIG. 3.

FIG. 4 shows an alternative method in which, in addition to heating with the aid of the centrally arranged primary heat energy source 4 positioned between two adjacently arranged foil layer pairs 1, 1', a pressing action is realized by employing heated pressing plates 5, 6 at the outer sides (ends) of the stack of foil layer pairs.

The press for performing the method according to the invention is schematically illustrated in the drawing. It has two pressing elements 2, 3, 5, 6 for loading several, preferably n, foil layer pairs 1, 1', . . . by resting against the outer sides of the stacked foil layer pairs and forcing the pairs toward one another, as well as n−1 bar-shaped, flat energy sources (heating elements) 4, 4', 4", . . . arranged in stacked arrangement in a common plane that is positioned at a right angle (perpendicular) to the planes of the thermoplastic foils. Preferably, the pressing elements are welding bars 2, 3 that are heatable, thus providing an ancillary heating energy source.

Each press has coordinated therewith a removal device, illustrated only by the schematic representation of arrow 7 in the drawing, for the removal, preferably in the form of an intermittent removal action, in the direction of arrow 7 common to all foil layer pairs 1, 1', 1", . . . away from the welding area (defined by the welding bars).

In the same plane in which the bar-shaped flat energy sources 4, 4', 4", . . . are arranged, flat support elements 8, 8', 8", . . . are positioned in a stacked arrangement. They have an outer coating for suppressing the adhesion of the foil layer pairs 1, 1', 1", . . . The outer coating of the support elements 8, 8', 8", . . . is formed by a heat-resistant and resilient, especially wear-resistant, foil envelope 9, 9', 9", . . . made of insulating material, preferably PTFE (polytetrafluoroethylene), optionally containing embedded fiberglass.

Each one of the foil envelopes 9, 9', 9", . . . is provided at its side facing away from the neighboring foil layer pairs 1, 1', 1", . . . with an adhesive coating for fastening the foil envelope 9, 9', 9", . . . to the flat support elements 8, 8', 8", . . .

The drawing shows that each foil envelope 9, 9', 9", . . . is folded to form a U-shape and is guided about the bar-shaped, flat energy source 4, 4', 4", . . . so that the two legs of the U-shape rest against the opposite surfaces of the flat support elements 8, 8', 8", . . . and form its outer coating.

According to one embodiment of the inventive press, the bar-shaped, flat energy sources 4, 4', 4", . . . comprise a flat, bar-shaped core as a support for an electrically heatable heating strip. This can be achieved in the simplest fashion in that at least the portion of the U-shaped folded foil envelope 9, 9', 9", . . . which is in contact with the bar-shaped core ,of the energy source is embodied as an electrically heatable heating strip.

According to one alternative it is also possible that the bar-shaped, flat energy source 4, 4', 4", . . . is formed by electrically heatable nickel constantan bodies. The plan view of FIG. 2 shows that the flat support elements 8, 8', 8", . . . are formed by sheet metal members having preferably a thickness of 2 to 3 mm and guiding the foil pairs 1, 1', 1", . . . separately and intermittently through the press in the direction of arrow 7. Moreover, FIG. 2 shows that the sheet metal members 8, 8', 8", . . . have lateral edge portions 10 which project past the longitudinal edges 11 of the foil layer pairs 1, 1', 1", . . . and are provided with fixation bores 12 for receiving fastening bolts (not represented).

In analogy to this configuration, the laterally projecting ends of the flat energy sources 4, 4', 4", . . . are provided with electrical supply bores 13.

While specific embodiments of the invention have been shown and described in detail to illustrate the inventive principles, it will be understood that the invention may be embodied otherwise without departing from such principles.

What is claimed is:

1. A press for simultaneously welding the layers for several pairs of thermoplastic foils, the press comprising:

two pressing elements for applying pressure to a stack of n pairs of layers of thermoplastic foils, wherein the two pressing elements are positioned at opposite ends of the stack and force the layers of the pairs of thermoplastic foils toward one another; and a stacked arrangement of n−1 heating elements aligned with the two pressing elements and configured to receive between two adjacent ones of the heating elements one of the pairs of thermoplastic foils such that the pairs of thermoplastic foils alternate with the heating elements, wherein the stacked arrangement of the heating elements is arranged in a plane that is perpendicular to the planes of the thermoplastic foils.

2. The press according to claim 1, wherein the pressing elements are heatable welding bars.

3. The press according to claim 1, further comprising a removal device configured to remove the n pairs from the area of the two pressing elements and the stacked arrangement in a common removal direction.

4. The press according to claim 1, further comprising n−1 support elements arranged in a stack positioned upstream of the stacked arrangement of the heating elements in a transport direction of the pairs of thermoplastic foils through the press, wherein the flat support elements are respectively aligned with the heating elements in a common plane parallel to the planes of the thermoplastic foils, and wherein the flat support elements have a coating suppressing adhesion of the thermoplastic foils.

5. The press according to claim 4, wherein the coating is comprised of a heat-resistant and wear-resistant foil envelope made of insulating material.

6. The press according to claim 5, wherein the insulating material is polytetrafluoroethylene.

7. The press according to claim 5, wherein the insulating material contains embedded fiberglass.

8. The press according to claim 5, wherein the foil envelope has an adhesive coating on a side thereof facing away from the pairs of thermoplastic foils and wherein the foil envelope is fastened with the adhesive coating to the flat support element.

9. The press according to claim 5, wherein the foil envelope has a U-shape such that the foil envelope is placed onto one surface of the flat support element, is guided about the adjacently positioned heating element, and then folded back onto the opposite surface of the flat support element.

10. The press according to claim 9, wherein each of the heating elements is comprised of a flat, bar-shaped core and an electrically heated heating strip mounted on the flat core.

11. The press according to claim 10, wherein the heating strip is a part of the foil envelope.

12. The press according to claim 4, wherein the flat support elements are sheet metal members configured to separately guide the pairs of thermoplastic foils.

13. The press according to claim 12, wherein the sheet metal members have a thickness of 2 to 3 mm.

14. The press according to claim 12, wherein the sheet metal members have lateral portions projecting past longitudinal edges of the thermoplastic foils in a direction perpendicular to a transport direction of the thermoplastic foils, wherein the lateral portions have fixation bores configured to receive securing bolts.

15. The press according to claim 1, wherein the heating elements are electrically heatable nickel constantan bodies.

* * * * *